US008135336B2

(12) United States Patent
Nawata (10) Patent No.: US 8,135,336 B2
(45) Date of Patent: Mar. 13, 2012

(54) REPEATER AND FOLLOW-UP NOTIFICATION METHOD AFTER BROADCAST COMMUNICATION THEREOF

(75) Inventor: Mitsuo Nawata, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 419 days.

(21) Appl. No.: 12/501,770

(22) Filed: Jul. 13, 2009

(65) Prior Publication Data

US 2010/0015915 A1 Jan. 21, 2010

(30) Foreign Application Priority Data

Jul. 17, 2008 (JP) ................................. 2008-185496

(51) Int. Cl.
*H04B 7/14* (2006.01)
(52) U.S. Cl. ....... 455/7; 455/11.1; 455/13.1; 455/412.2; 455/515; 370/274
(58) Field of Classification Search .................. 455/7, 8, 455/9, 11.1, 13.1, 41.2, 515, 552.1, 412.2, 455/414.1, 428, 458; 370/254, 351, 374, 370/329, 328, 334; 340/10.4; 342/357.01
See application file for complete search history.

(56) References Cited

U.S. PATENT DOCUMENTS

| 6,169,497 | B1 * | 1/2001 | Robert ........................... 340/988 |
| 6,289,042 | B1 * | 9/2001 | Hegemier et al. ............. 375/211 |
| 6,594,469 | B1 * | 7/2003 | Serri et al. .................... 455/12.1 |
| 7,330,693 | B1 * | 2/2008 | Goss ............................. 455/3.01 |
| 7,468,953 | B2 * | 12/2008 | Maegawa et al. ............. 370/254 |
| 7,881,659 | B2 * | 2/2011 | Utakouji et al. .............. 455/11.1 |
| 2006/0077906 | A1 * | 4/2006 | Maegawa et al. ............. 370/254 |
| 2006/0178106 | A1 * | 8/2006 | Utakouji et al. .............. 455/11.1 |
| 2006/0178162 | A1 * | 8/2006 | Utakouji et al. .............. 455/522 |

FOREIGN PATENT DOCUMENTS

| CN | 1126016 | 7/1996 |
| JP | 05-344037 | 12/1993 |
| JP | 09-162822 | 6/1997 |
| JP | 2001-119339 | 4/2001 |
| WO | 9428687 | 12/1994 |

* cited by examiner

*Primary Examiner* — Tan Trinh
(74) *Attorney, Agent, or Firm* — Brundidge & Stanger, P.C.

(57) ABSTRACT

A repeater including a first wireless unit that performs transmission and reception using a frequency for communicating with a base station and a second wireless unit that performs transmission and reception using a frequency for communicating with a mobile station performs a follow-up communication after broadcast communication. The repeater causes, while the second wireless unit transmits a broadcast communication signal (TCH (voice data)) to the mobile station, a transmitter (TX) provided on the first wireless unit to regularly transmit a switching signal (UI signal (for designating a direct communication wireless channel, and for setting a direct communication simplex call) for switching the mobile station to a broadcast communication channel.

12 Claims, 9 Drawing Sheets

REPEATER AND FOLLOW-UP NOTIFICATION METHOD AFTER BROADCAST COMMUNICATION THEREOF

INCORPORATION BY REFERENCE

The present application claims priority from Japanese application JP 2008-185496 filed on Jul. 17, 2008, the content of which is hereby incorporated by reference into this application.

BACKGROUND OF THE INVENTION

The present invention relates to a repeater in a wireless communication system. More particularly, the present invention relates to a repeater that performs a follow-up communication after broadcast communication and a follow-up notification method after the broadcast communication thereof.

For example, a Digital mobile Telecommunication System for Local Government (e.g., refer to ARIB STD T-79 and Association of Radio Industries and Business) includes a control station equipment, a base station equipment, a fixed station equipment, and a mobile station equipment by taking one local government (prefectural and city governments) as a basic unit. Communication is performed between the control station and the mobile station (or the fixed station), or between the mobile station (or the fixed station) and the mobile station (or the fixed station) via the base station or directly.

The above-described technology is disclosed in, for example, JP-A-2001-119339.

SUMMARY OF THE INVENTION

A related technology of the present invention will be described with reference to FIGS. 7 to 9 for convenience of description of the after-mentioned present invention.

Broadcast communication herein described is a simplex communication system for concurrently transmitting information sent from a control table (via a base station) to a plurality of objective mobile stations.

Specifically, signals indicating information (e.g., frequency and slot numbers) for identifying a communication channel (e.g., USC: User Specific Channel) performing broadcast communication are transmitted via a control channel (e.g., CAC: Common Access Channel) of the base station. The mobile station that has received the signals receives a voice/data signal in a frequency and slot number of the designated communication channel.

In the broadcast communication herein described, a signal (hereinafter, referred to as a follow-up signal) indicating information of the communication channel that performs broadcast communication is regularly transmitted via the control channel also after the start of communication. This encourages the mobile station that fails to receive signals during the start of communication to change to the communication channel. This reason being that since the broadcast communication indicates extremely important information, more mobile stations are required to be allowed to change to the communication channel.

Figure 7:
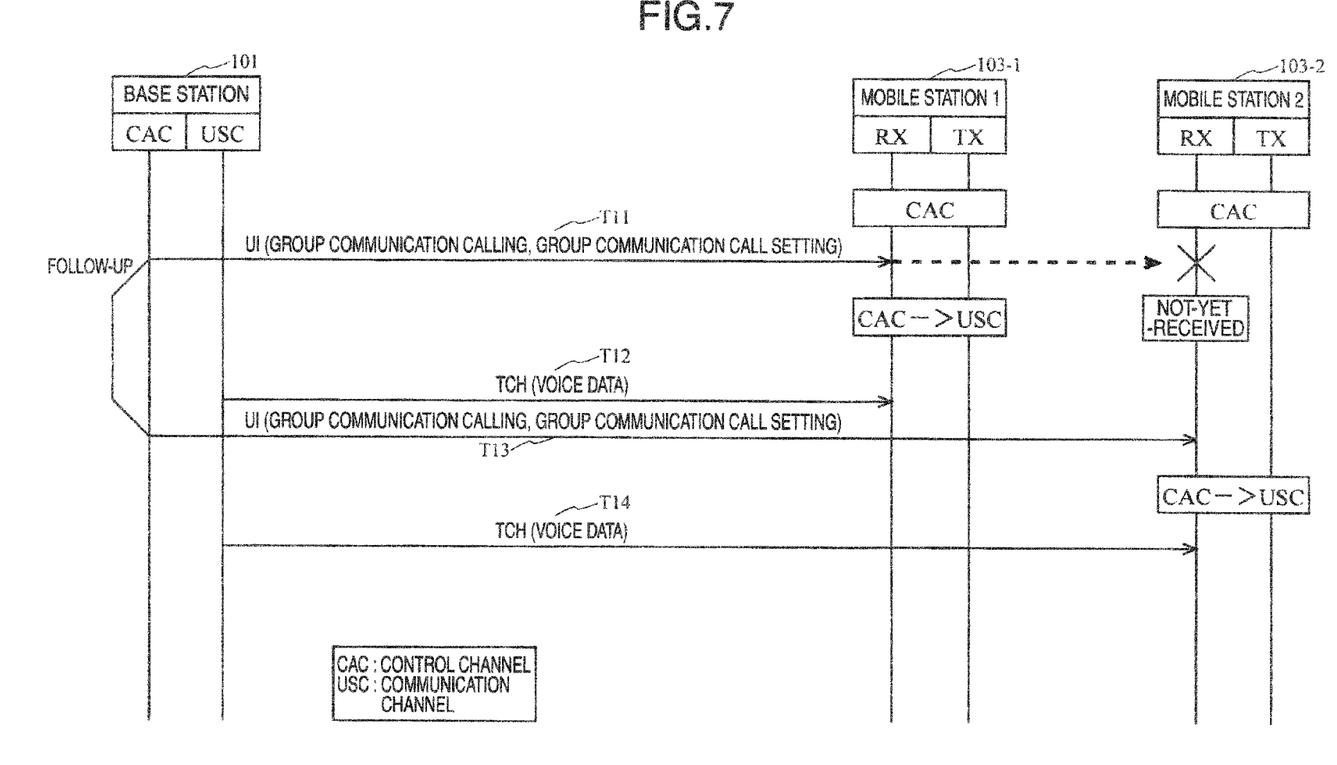
FIG. 7 illustrates one embodiment of a processing flow of broadcast communication in a base station.

FIG. 7 illustrates one embodiment of a processing flow of the broadcast communication in the base station.

The UI signal (signal (UI: Unnumbered Information) for calling a group communication and for setting a group communication call) is wirelessly transmitted via the CAC from the base station 101 (processing T11). When receiving this UI signal via the CAC, the mobile station 103-1 changes from a transmission/reception standby state via the CAC to that via the USC and receives, via the USC, voice data (TCH: Traffic Channel) that is wirelessly transmitted via the USC from the base station 101 (processing T12). On the other hand, the mobile station 103-2 does not yet receive the UI signal from the base station 101.

Thereafter, the UI signal is wirelessly transmitted regularly as a follow-up signal via the CAC from the base station 101 (processing T13). When receiving the UI signal, the mobile station 103-2 changes from the transmission/reception standby state via the CAC to that via the USC and receives via the USC the voice data (TCH) that is wirelessly transmitted via the USC from the base station 101 (processing T14).

Subsequently, when performing group communication by direct communication between the mobile stations, the mobile station as a source transmits a transition signal from the control channel (e.g., CAC) to the communication channel (e.g., USC). Then, the mobile station itself as the source also changes from the transmission/reception standby state via the control channel to that via the communication channel. Here, since including only one pair of wireless units, the mobile station is prevented from transmitting the follow-up signal via the control channel. Therefore, the mobile station (including one mobile station that does not start up immediately after the transmission, another mobile station that is absent within a communication area of a repeater (or a repeating station), and so forth) that fails to receive signals (transition signals) immediately after the transmission is unable to participate in the group communication.

Figure 8:
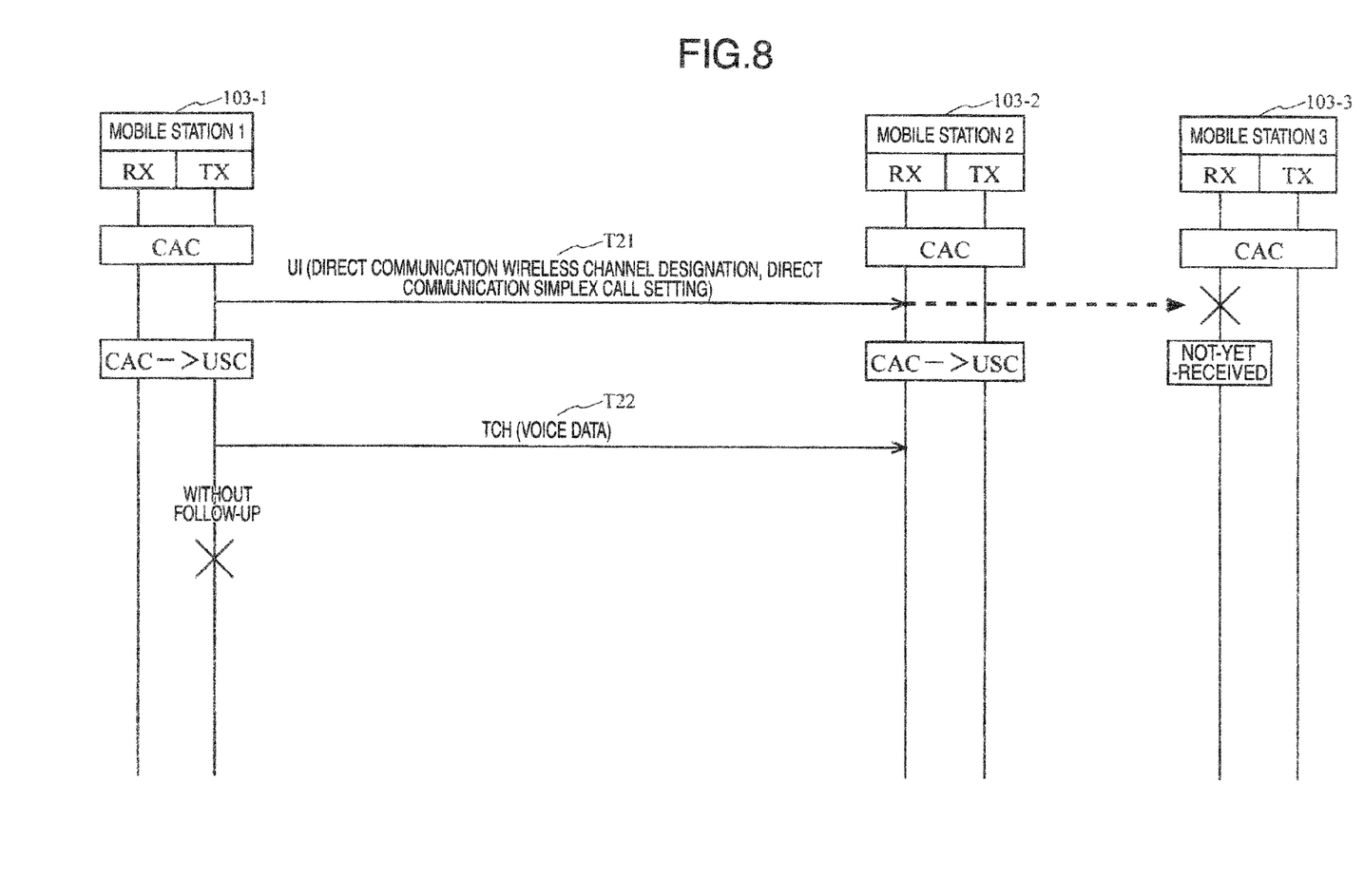
FIG. 8 illustrates one embodiment of a processing flow of direct group communication.

FIG. 8 illustrates one embodiment of a processing flow of the direct group communication.

The mobile station 103-1 wirelessly transmits the UI signal (signal for designating a direct communication wireless channel and for setting a direct communication simplex call) via the CAC (processing T21), and changes from the transmission/reception standby state via the CAC to that via the USC.

When receiving the UI signal via the CAC, the mobile station 103-2 changes from the transmission/reception standby state via the CAC to that via the USC, and receives via the USC the voice data (TCH) that is wirelessly transmitted via the USC from the mobile station 103-1 (processing T22). On the other hand, the mobile station 103-3 has not yet received the UI signal from the mobile station 103-1. In this case, since the follow-up signal is not transmitted, the mobile station 103-3 that fails to receive the first UI signal (transition signal) is unable to participate in the group communication.

Next, when performing the broadcast communication in a system using the repeater, since the direct communication is performed between the repeater and the mobile station, the repeater is hampered from transmitting the follow-up signal to the mobile station within the repeater zone. Therefore, there occurs a problem that when failing to receive the first signal, the mobile station within the repeater zone is prevented from participating in the broadcast communication.

Figure 9:
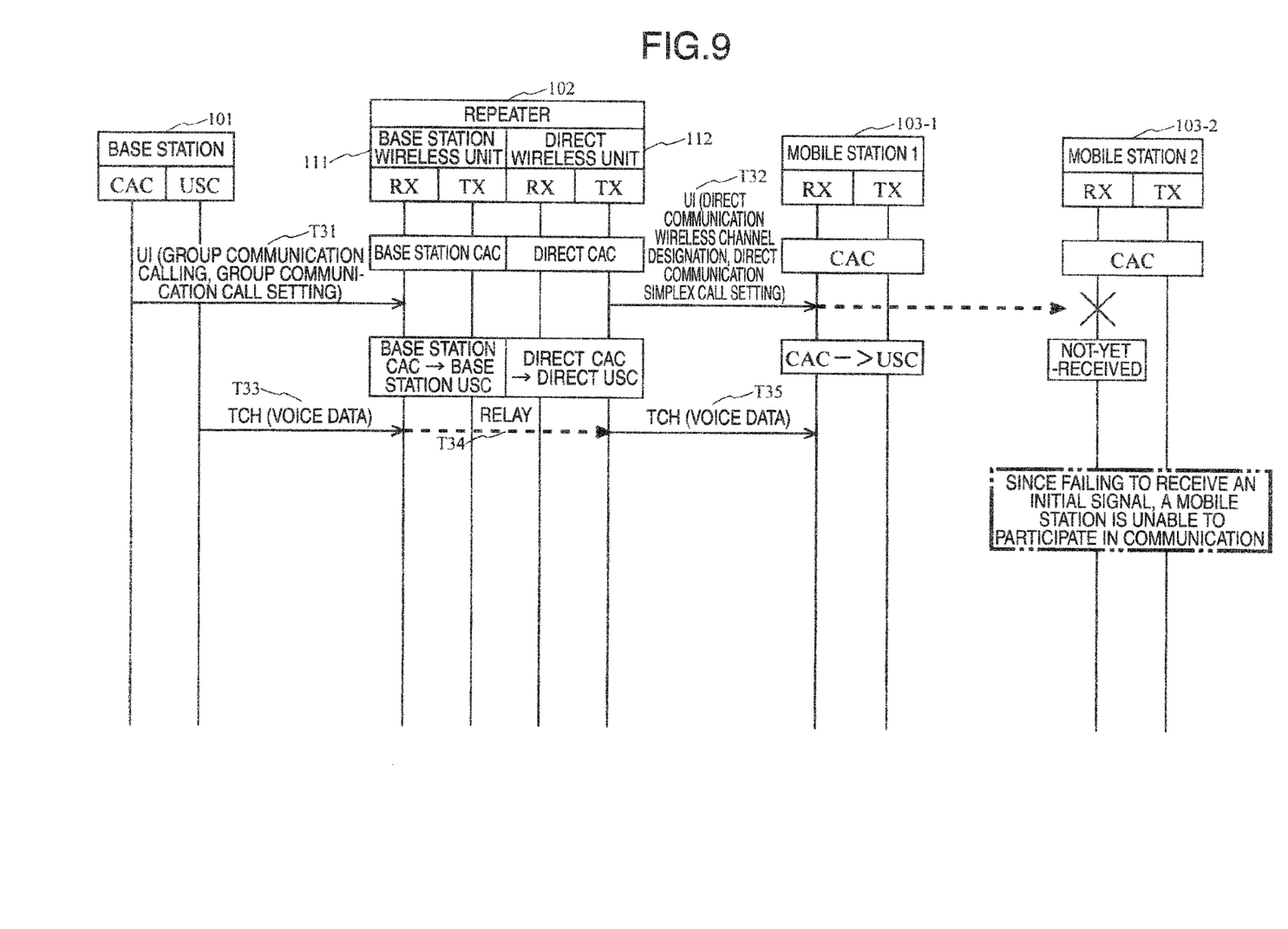
FIG. 9 illustrates one embodiment of a processing flow of relaying broadcast communication (without follow-up notification).

FIG. 9 illustrates one embodiment of a processing flow of the relaying broadcast communication (without the follow-up notification).

The base station 101 wirelessly transmits the UI signal (signal for calling a group communication and for setting a group communication call) via the CAC (processing T31).

In the repeater 102, when the base station wireless unit 111 receives this UI signal via the CAC, the direct wireless unit 112 wirelessly transmits via the CAC the UI signal (signal for designating a direct communication wireless channel and for setting a direct communication simplex call) (processing T32). Subsequently, the base station wireless unit 111 changes from the transmission/reception standby state via the CAC to that via the USC, and as the same time, the direct wireless unit 112 changes from the transmission/reception standby state via the CAC to that via the USC.

Thereafter, the base station 101 wirelessly transmits the voice data (TCH) via the USC to the repeater 102 (processing T33). Further, both of the base station wireless unit 111 and the direct wireless unit 112 relay the voice data (TCH) via the USC (processing T34), and the repeater 102 wirelessly transmits the corresponding voice data (TCH) via the USC (processing T35).

The mobile station 103-1 changes, when receiving the UI signal from the repeater 102 via the CAC, from the transmission/reception standby state via the CAC to that via the USC. Thereafter, the mobile station 103-1 receives the voice data (TCH) from the repeater 102 via the USC. On the other hand, the mobile station 103-2 has not yet received the UI signal as an initial signal from the repeater 102. Then, since failing to receive the follow-up signal, the mobile station 103-2 is unable to participate in the communication.

As described above, in a disaster prevention radio system, a signal (a follow-up signal) called a follow-up notification is regularly transmitted from the base station to the mobile stations after performing the broadcast communication for the purpose of following a terminal device that fails to receive a channel switching command signal (the UI signal in the above-described embodiment) for receiving the broadcast communication.

However, the repeater and the mobile station that performs the direct communication are unable to perform a follow-up notification due to the following reason. That is, for the purpose of receiving the voice notification by themselves, the repeater and the mobile station inform, when receiving a channel switching command signal to the effect that the broadcast communication is performed, the mobile stations performing communication with themselves that the switching is performed to a channel for receiving the broadcast communication, and then, also change to the transmission/reception standby state via the communication channel for receiving the broadcast communication. Therefore, there is a problem that the mobile station that is unable to receive the first broadcast communication information (the UI signal in the above-described embodiment) remains prevented from receiving the broadcast communication later on.

In view of the foregoing, it is an object of the present invention to provide a repeater capable of reducing, by performing the follow-up notification, a mobile station that is unable to receive the broadcast communication and a follow-up notification method after the broadcast communication thereof.

To accomplish the above object, according to one aspect of the present invention, the following structure is included in a repeater having a first wireless unit that performs transmission and reception using a frequency for communicating with a base station and a second wireless station that performs transmission and reception using a frequency for communicating with a mobile station.

That is, the repeater causes, while the second wireless unit transmits a broadcast communication signal to the mobile station, a transmitter provided on the first wireless unit to regularly transmit a switching signal for switching the mobile station to a broadcast communication channel.

Accordingly, when the repeater regularly transmits a switching signal for switching the mobile station to the broadcast communication channel and performs the follow-up notification, the mobile station that is unable to receive the broadcast communication can be reduced.

Here, as one frequency for communicating with the base station or another frequency for communicating with the mobile station, for example, a frequency of the control channel and that of the communication channel are used, respectively. Further, when a frequency different in the transmission and the reception is used, a frequency for the transmission and that for the reception are used, respectively.

Further, various signals may be used, respectively, as the broadcast communication signal or the switching signal.

Various intervals may be used as a time interval for regularly performing transmission.

According to another aspect of the present invention, the repeater has the following configuration as one configuration example.

Specifically, the first wireless unit includes a transmitter having a transmission function and a receiver having a reception function;

the second wireless unit includes a transmitter having a transmission function and a receiver having a reception function;

before broadcast communication starts, the transmitter and receiver of the first wireless unit and the transmitter and receiver of the second wireless unit each are in the transmission/reception standby state via a control channel; and when the broadcast communication starts, the receiver of the first wireless unit changes to a reception standby state via a communication channel corresponding to the reception from the base station, the transmitter and receiver of the second wireless unit change to the transmission/reception standby state via a communication channel corresponding to the transmission and reception with the mobile station, the transmitter of the first wireless unit changes to a transmission standby state via a control channel corresponding to the transmission to the mobile station, and the transmitter of the first wireless unit regularly transmits a switching signal for switching the mobile station to a broadcast communication channel.

Accordingly, when the broadcast communication starts, a receiver of the first wireless unit and a transmitter and receiver of the second wireless unit each change to the transmission/reception standby state via the communication channel, a transmitter of the first wireless unit changes to the transmission standby state via the control channel corresponding to the transmission to the mobile station, the transmitter of the first wireless unit regularly transmits a switching signal for switching the mobile station to a broadcast communication channel, and the repeater performs the follow-up notification, thereby reducing the mobile station that is unable to receive the broadcast communication.

According to another aspect of the present invention, in a follow-up notification method after broadcast communication of the repeater including the first wireless unit that performs transmission and reception using a frequency for communicating with the base station, and the second wireless unit that performs transmission and reception using a frequency for communicating with the mobile station, the following processing is performed.

Specifically, the repeater causes, while the second wireless unit transmits a broadcast communication signal to the mobile station, the transmitter provided on the first wireless unit to regularly transmit a switching signal for switching the mobile station to a broadcast communication channel.

Accordingly, the repeater regularly transmits a switching signal for switching the mobile station to the broadcast communication channel and performs the follow-up notification, thereby reducing the mobile station that is unable to receive the broadcast communication.

As described above, according to the present invention, the repeater regularly transmits a switching signal for switching the mobile station to the broadcast communication channel and performs the follow-up notification, thereby reducing the mobile station that is unable to receive the broadcast communication.

Other objects, features and advantages of the invention will become apparent from the following description of the embodiments of the invention taken in conjunction with the accompanying drawings.

DESCRIPTION OF THE EMBODIMENTS

Embodiments of the present invention will be described in detail below with reference to the accompanying drawings.

Figure 3:
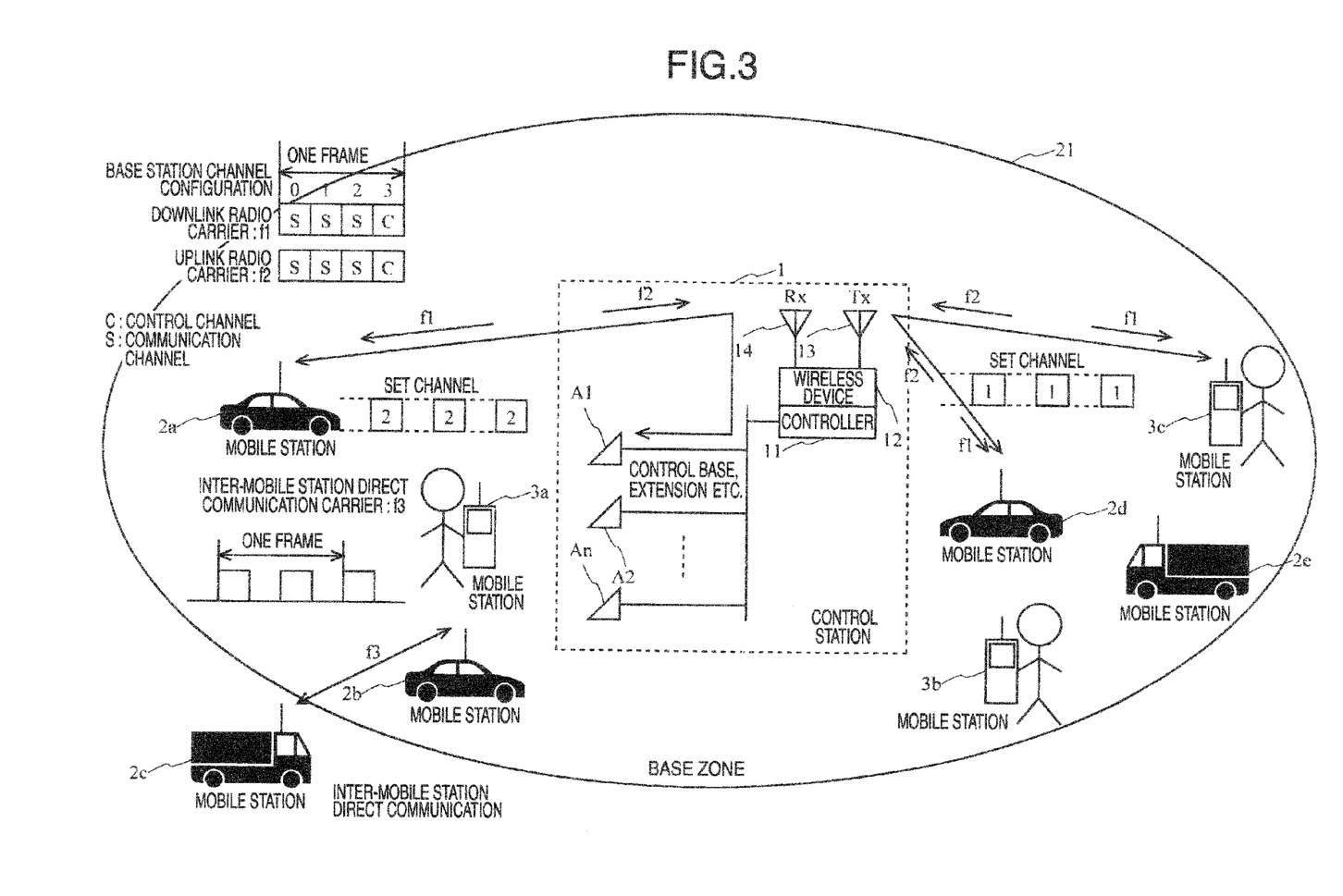
FIG. 3 illustrates one embodiment of a digital wireless communication system.
Figure 4:
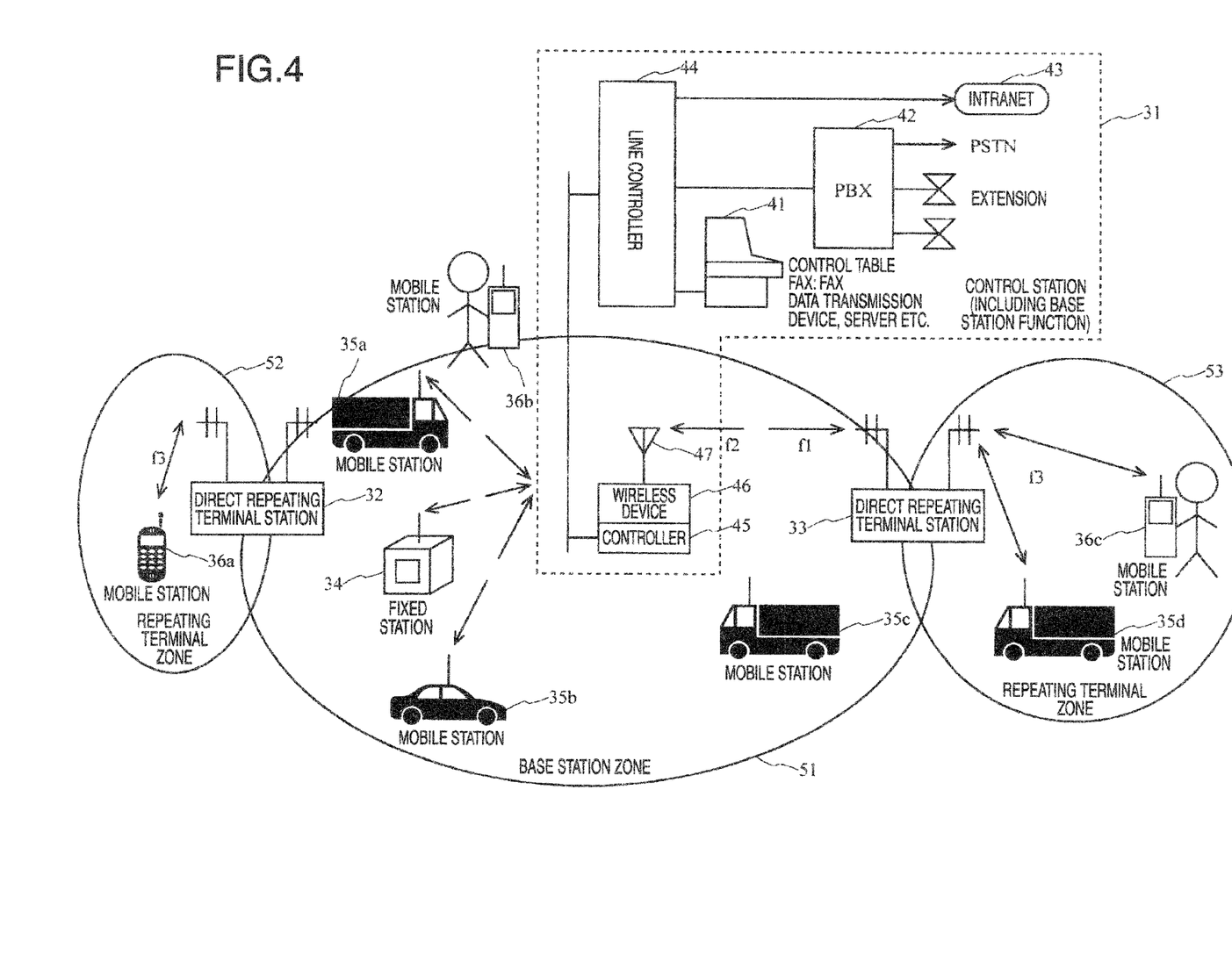
FIG. 4 illustrates one embodiment of an automatic relaying system.
Figure 5:
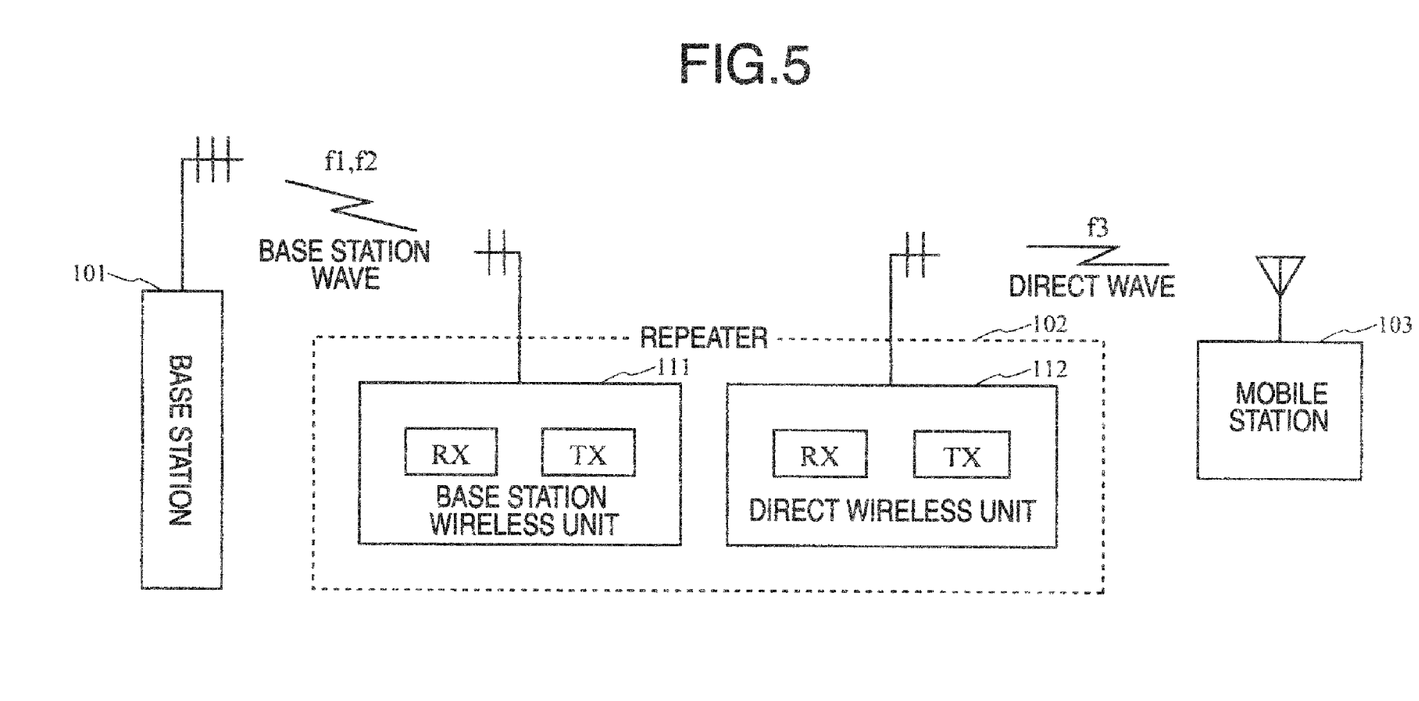
FIG. 5 illustrates one embodiment of repeaters.

A repeater (a direct repeating terminal station apparatus) according to one embodiment of the present invention is provided, for example, on the same digital wireless communication system as illustrated in FIG. 3 (and FIG. 6), used in the same automatic relaying system as illustrated in FIG. 4, and has the same schematic configuration as illustrated in FIG. 5.

FIG. 3 illustrates one embodiment of the above-described digital wireless communication system.

The digital wireless communication system of the embodiment includes a control station 1 and a plurality of mobile stations 2a to 2e and 3a to 3c. Embodiments of the mobile stations include in-car mobile stations 2a to 2e and portable mobile stations 3a to 3c.

The control station 1 includes a controller 11 composing a function of a base station, a wireless device 12, a transmission antenna 13, a reception antenna 14, a control table, and extensions Al to An (n is an integer equal to or more than one).

The base station forms a base zone 21 as a range of performing wireless communication with the mobile stations 2a to 2e and 3a to 3c.

In the digital wireless communication system of the embodiment, in a downlink communication from the base station to the mobile stations 2a to 2e and 3a to 3c, a frequency band f1 is used. In the uplink communication from the mobile stations 2a to 2e and 3a to 3c to the base station, a frequency band f2 is used. Further, in the inter-mobile station direct communication among the mobile stations 2a to 2e and 3a to 3c, a frequency band f3 is used.

Here, one control channel is generally allocated to each base station. Meanwhile, only one control channel for direct communication is the same type across the country, and the communication can be performed when communication areas are not overlapped with each other. The direct communication described in the present embodiment includes not only one-way (from the repeater to the mobile station) communication or two-way (full-duplex/half-duplex) communication between the repeater and the mobile station, but also direct two-way (full-duplex/half-duplex) communication between the mobile stations without relaying a system such as the repeater. In addition, the present invention is not limited thereto; further, other various configurations may be used.

In the above-described digital wireless communication system, a repeating terminal station apparatus may be provided.

Here, the repeating terminal station apparatus means a station that performs the radio relaying for temporarily or permanently covering a radio blind zone within a service area (base zone 21) of the base station or an area outside the range of the service area.

The repeating terminal station apparatus includes a "base repeating terminal station apparatus" that relays a carrier frequency for one base station communication to that for another base station communication, and a "direct repeating terminal station apparatus" that relays a carrier frequency for base station communication and that for inter-mobile station direct communication to each other.

FIG. 4 illustrates one embodiment of an automatic relaying system. The automatic relaying system of the embodiment is adaptable to the digital wireless communication system as illustrated in FIG. 3.

The automatic relaying system of the embodiment includes the control station (configuration example including a function of the base station) 31, a plurality of direct repeating terminal stations 32 and 33, a fixed station apparatus 34, and a plurality of mobile stations 35a to 35d and 36a to 36c.

The control station 31 includes a control table, a facsimile (FAX), a data transmission equipment, and/or a server etc. 41; a PBX (Private Branch Exchange) 42 connected to an extension and a PSTN (Public Switched Telephone Network); an intranet 43; a line controller 44 connected thereto; and a controller 45, wireless equipment 46, and antenna 47 composing the base station.

The base station forms a base zone 51 as a range of performing wireless communication with the mobile stations 35a to 35d and 36a to 36c.

Further, respective direct repeating terminal stations 32 and 33 form repeating terminal zones 52 and 53 as a range of performing wireless communication with the mobile stations 35a to 35d and 36a to 36c.

Unless otherwise stated in the present embodiment below, the repeater represents a direct repeating terminal station apparatus.

For performing communication between "the base station, the repeater, and the mobile station", the repeater includes two pairs of one wireless unit (base station wireless unit) that performs transmission and reception for the communication with the base station and another wireless unit (direct wireless unit) that performs transmission and reception for the direct communication.

FIG. 5 illustrates a configuration example of a repeater 102, and also a base station 101 and a mobile station 103.

The repeater 102 of the embodiment includes a base station wireless unit 111 that transmits and receives radio signals (e.g., signals of frequency bands f1 and f2 illustrated in FIG. 3) of base station waves with the base station 101, and a direct wireless unit 112 that transmits and receives radio signals (e.g., signals of a frequency band f3 illustrated in FIG. 3) of direct waves with the mobile station 103.

The base station wireless unit 111 and the direct wireless unit 112 each have a transmitter (TX), a receiver (RX), and an antenna.

The repeater 102 of the embodiment includes the base station wireless unit 111 in which a transmission/reception frequency of base station waves is set, and the direct wireless unit 112 in which a transmission/reception frequency of direct waves is set, those of which are connected via an external interface.

The repeater 102 performs one relaying processing that the base station wireless unit 111 wirelessly receives signals from the base station 101 and then the direct wireless unit 112 wirelessly transmits the signals to the mobile station 103. Also, the repeater 102 performs another relaying processing that the direct wireless unit 112 wirelessly receives signals from the mobile station 103 and then the base station wireless unit 111 wirelessly transmits the signals to the base station 101.

Figure 6:
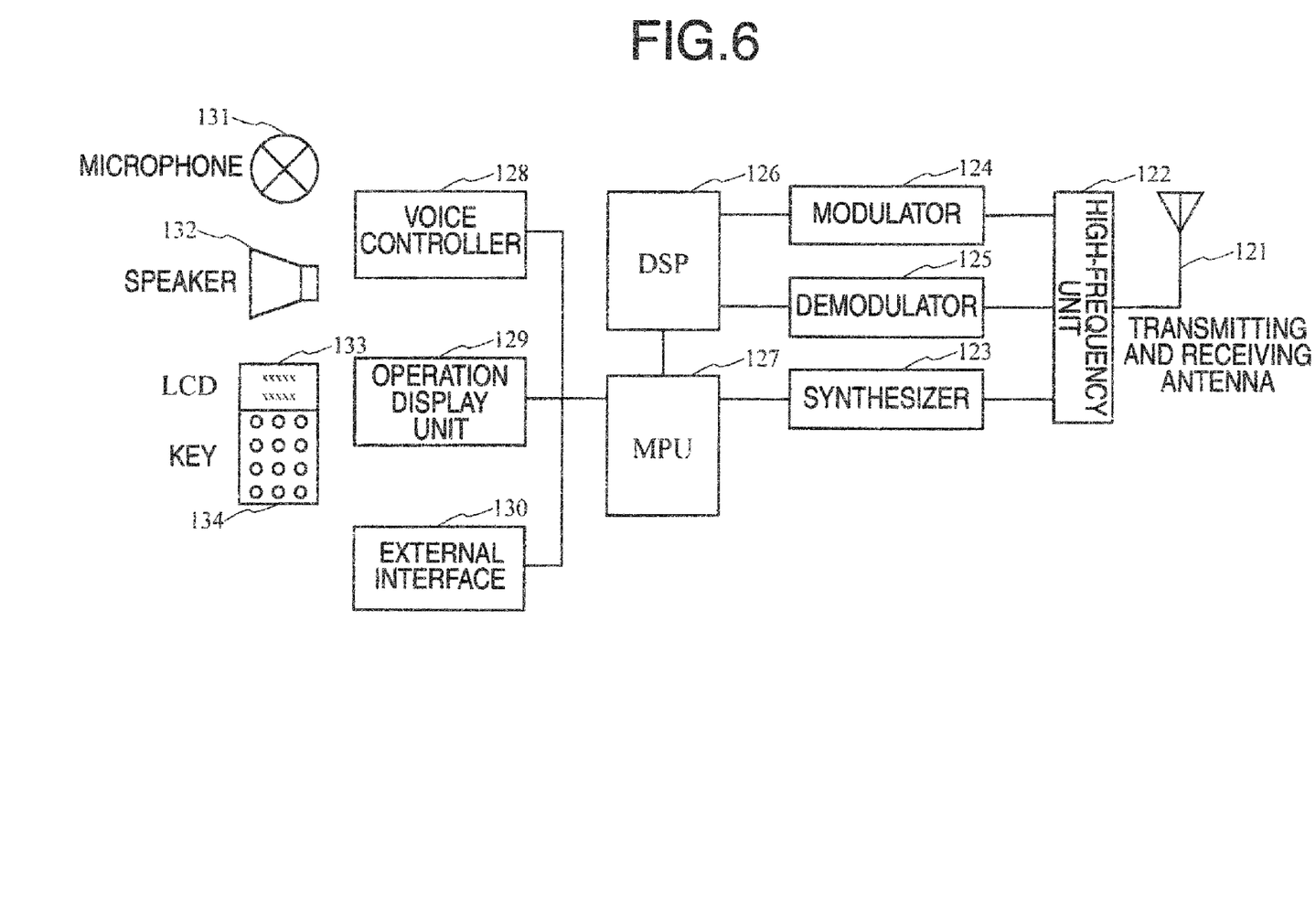
FIG. 6 illustrates a configuration example of a wireless unit.

FIG. 6 illustrates a configuration example of each wireless unit (mobile station 103).

The wireless unit of the embodiment includes, as a processor for performing wireless communication, a transmitting and receiving antenna 121, a high-frequency unit 122, a synthesizer 123 for setting a transmission/reception frequency, a modulator (transmission) 124, and a demodulator (reception) 125. Also, the wireless unit includes a DSP (Digital Signal Processor) 126, an MPU (Micro Processor Unit) 127 for controlling operations of the wireless unit, a voice controller 128 for controlling a microphone 131 and a speaker 132, an operation display unit 129 for performing display of an LCD (Liquid Crystal Display) 133 and for performing an input operation of a key 134, and an external interface 130 for external connection.

The following will describe operations performed by the repeater of the embodiment.

For convenience of description, using reference numerals illustrated in FIG. 5, a reference numeral 101 denotes the base station, 102 denotes the repeater, 103 (103-1 and 103-2) denotes the mobile stations, 111 denotes the base station wireless unit of the repeater 102, and 112 denotes the direct wireless unit of the repeater 102.

Here, in the embodiment, a directional antenna for performing wireless communication with the base station 101 is preferably used as an antenna for the base station wireless unit 111; however, when there is not a trouble such as interference, a nondirectional antenna may be used. In the same manner, when communicable with the mobile station 103, various antennas may be used as an antenna for the direct wireless unit 112.

The repeater 102 of the embodiment includes the base station wireless unit 111 which can perform transmission and reception with the base station and the direct wireless unit 112 which can perform transmission and reception with the mobile station. Both transmission/reception frequencies of the base station waves are set in the base station wireless unit 111, and both transmission/reception frequencies of the direct waves are set in the direct wireless unit 112.

Since transmission and reception are always performed in the relaying of duplex individual communication, both of the transmission and reception frequencies of the wireless units 111 and 112 remain set to base station waves/direct waves. However, since the group communication such as the broadcast communication is a simplex communication, any one of the transmission wireless unit (TX) for base station waves and that for direct waves of the repeater 102 does not perform the transmission.

For example, in the broadcast communication from the control station, the transmission direct wireless unit (TX) transmits the voice data received by the reception base station wireless unit (RX) of the repeater 102. In short, the transmission base station wireless unit (TX) of the repeater 102 is not used during the above-described time.

To cope with the above-described problem, in the embodiment, the broadcast communication starts and the direct wireless unit 112 changes to a transmission/reception standby state via the communication channel (USC). Thereafter, the transmission base station wireless unit (TX) of the repeater 102 is set to a frequency of the control channel (CAC) for direct waves to transmit the follow-up signal. This enables the follow-up signal to be transmitted to the mobile stations 103 within the repeater zone.

Figure 1:
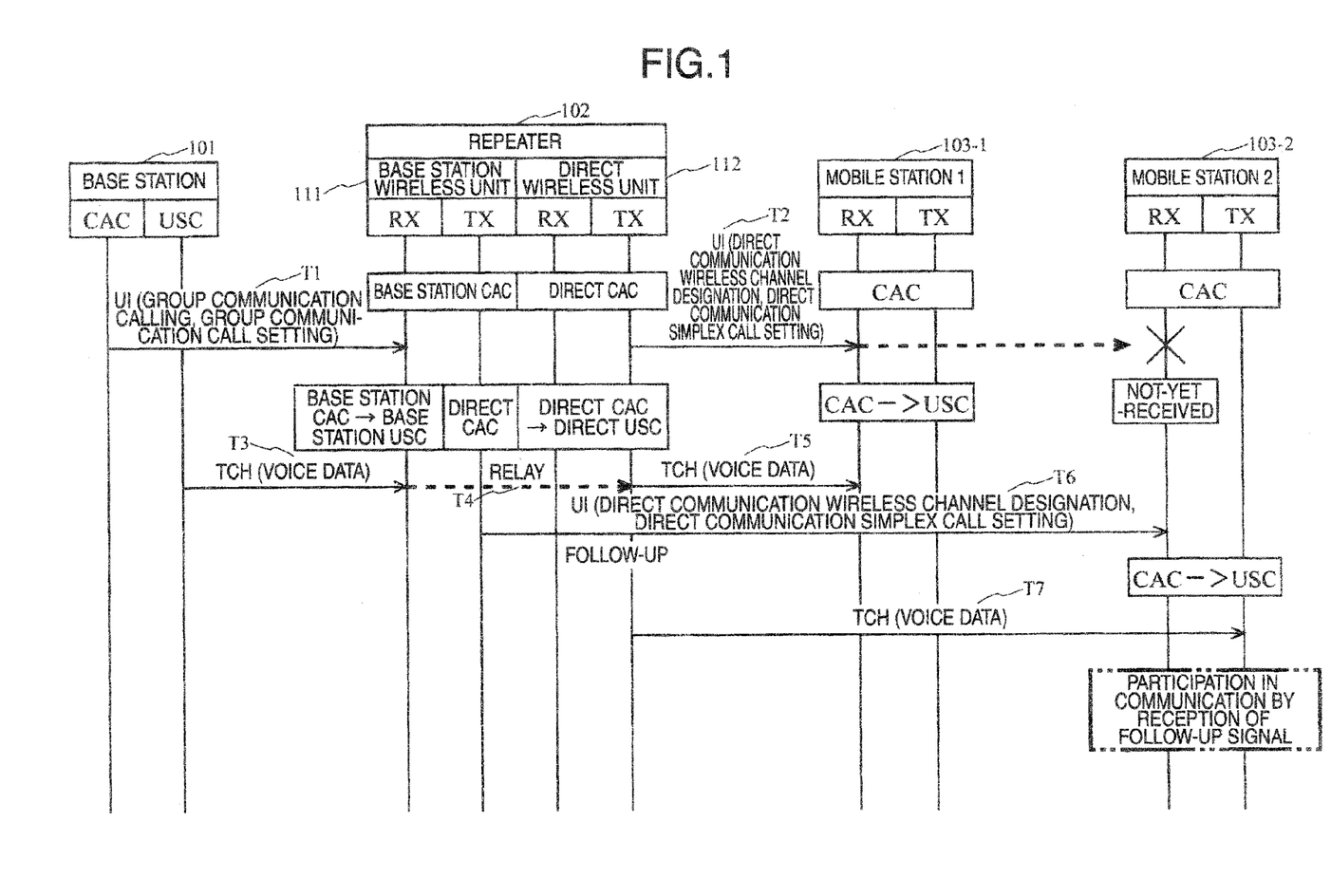
FIG. 1 illustrates one embodiment of a processing flow of relaying broadcast communication (with follow-up notification) according to the present embodiment of the invention.

FIG. 1 illustrates one embodiment of a processing flow of the relaying broadcast communication (with the follow-up notification).

The base station 101 wirelessly transmits the UI signal (signal for calling a group communication and for setting a group communication call) via the CAC (processing T1).

In the repeater 102, when the receiver (RX) of the base station wireless unit 111 receives this UI signal via the CAC, the transmitter (TX) of the direct wireless unit 112 wirelessly transmits the UI signal (signal for designating a direct communication wireless channel and for setting a direct communication simplex call) via the CAC (processing T2). The receiver (RX) of the base station wireless unit 111 changes from the reception standby state via the CAC to that via the USC, the transmitter (TX) of the base station wireless unit 111 changes from a transmission standby state via the CAC for base station waves to that via the CAC for direct waves, and the receiver (RX) and transmitter (TX) of the direct wireless unit 112 changes from the transmission/reception standby state via the CAC to that via the USC.

Thereafter, the repeater 102 receives the voice data (TCH) wirelessly transmitted via the USC by the base station 101 (processing T3). Further, via both of the USCs of the receiver (RX) of the base station wireless unit 111 and the transmitter (TX) of the direct wireless unit 112, the received voice data is relayed (processing T4), and the transmitter (TX) of the direct wireless unit 112 wirelessly transmits the corresponding voice data (TCH) via the USC (processing T5).

When the receiver (RX) of the mobile station 103-1 receives the UI signal from the repeater 102 via the CAC, the receiver (RX) and transmitter (TX) thereof changes from the transmission/reception standby state via the CAC to that via the USC. Thereafter, the receiver (RX) of the mobile station 103-1 receives the voice data (TCH) from the repeater 102 via the USC. The mobile station 103-1 participates in the communication with the base station. On the other hand, at first, the mobile station 103-2 has not yet received the UI signal as an initial signal from the repeater 102. The mobile station 103-2 is unable to participate in the communication with the base station.

Here, in the embodiment, after the above-described state transition, the repeater 102 causes the transmitter (TX) of the base station wireless unit 111 to wirelessly transmit the UI signal (signal for designating a direct communication wireless channel and for setting a direct communication simplex call) as the follow-up signal via the CAC for direct waves (processing T6).

Also in the mobile station 103-2 that fails to receive the first UI signal, this enables the receiver (RX) to receive the UI signal as the follow-up signal from the repeater 102 via the CAC. According to the above-described reception, the receiver (RX) and the transmitter (TX) change from the transmission/reception standby state via the CAC to that via the USC. Thereafter, the receiver (RX) can receive the voice data (TCH) via the USC from the transmitter (TX) of the direct wireless unit 112 of the repeater 102 via the USC (processing T7). Thus, the mobile station 103-2 that fails to receive the first UI signal can also participate in the communication with the base station by the reception of the follow-up signal.

Figure 2A:
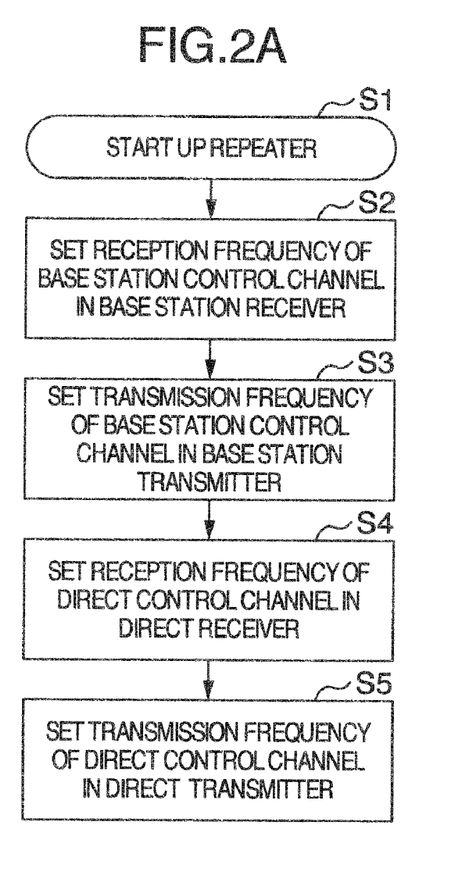
FIGS. 2A and 2B illustrate one embodiment of a control processing procedure of relaying broadcast communication (with follow-up notification) according to the present embodiment of the invention.
Figure 2B:
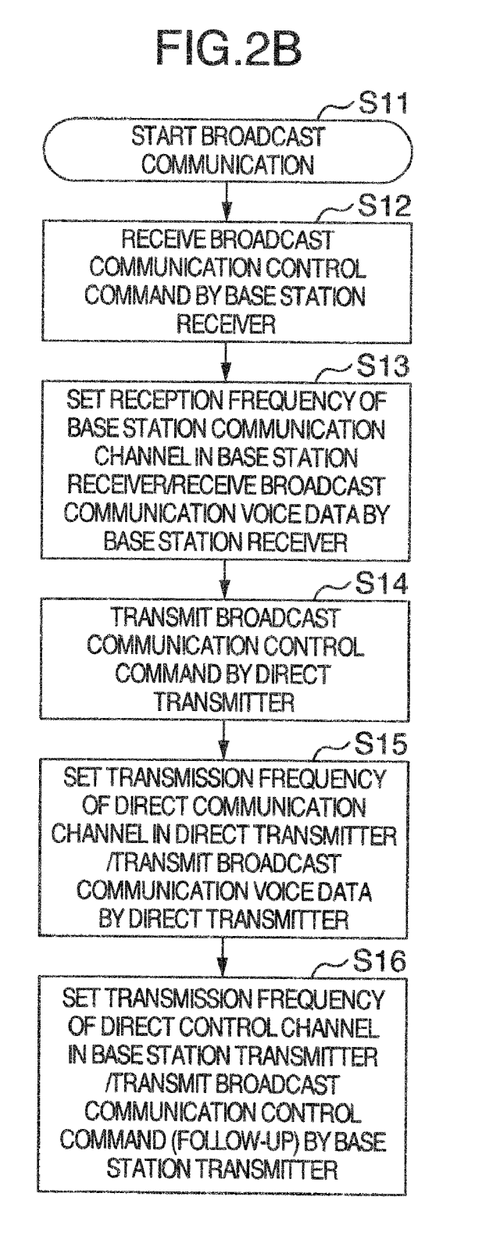

FIGS. 2A and 2B illustrate one embodiment of a control processing procedure on the relaying broadcast communication (with the follow-up notification) of the embodiment.

When the repeater 102 is started up (step S1), a reception frequency of the control channel (CAC) for base station waves is set in the receiver (RX) of the base station wireless unit 111 (step S2), a transmission frequency of the control channel (CAC) for base station waves is set in the transmitter (TX) of the base station wireless unit 111 (step S3), a reception frequency of the control channel (CAC) for direct waves is set in the receiver (RX) of the direct wireless unit 112 (step S4), and a transmission frequency of the control channel (CAC) for direct waves is set in the transmitter (TX) of the direct wireless unit 112 (step S5).

When the broadcast communication starts (step S11), the repeater 102 causes the receiver (RX) of the base station wireless unit 111 to receive a broadcast communication control command (the UI signal in the embodiment) (step S12). The reception frequency on the communication channel (USC) for base station waves is set in the receiver (RX) of the base station wireless unit 111, and the receiver (RX) starts to receive the broadcast communication voice data (TCH in the embodiment) (step S13).

The repeater 102 causes the transmitter (TX) of the direct wireless unit 112 to wirelessly transmit the broadcast communication control command (the UI signal in the embodiment) (step S14). The transmission frequency of the communication channel (USC) for direct waves is set in the transmitter (TX) of the direct wireless unit 112, and the transmitter (TX) starts to transmit the broadcast communication voice data (TCH in the embodiment) (step S15).

In the repeater 102, the transmission frequency of the control channel (CAC) for direct waves is set in the transmitter (TX) of the base station wireless unit 111, and the transmitter (TX) starts to transmit the broadcast communication control command (the UI signal in the embodiment) for performing the follow-up notification (step S16). The transmitter (TX) regularly performs the above-described follow-up notification.

Here, as timing for switching (changing a state of the set frequency) a frequency set in each of the transmitter (TX) and receiver (RX) of the base station wireless unit 111 as well as the transmitter (TX) and receiver (RX) of the direct wireless unit 112, various timings may be used. For example, when the transmitter (TX) of the base station wireless unit 111 only switches a frequency of the control channel (CAC) for direct waves and does not perform the transmission (when there is not a trouble in the other units), a timing for the switching is available at any time. As one embodiment, when the transmitter (TX) of the direct wireless unit 112 starts to transmit the voice data (TCH), switching control can be performed such that the transmitter (TX) of the base station wireless unit 111 starts to transmit a signal from the control channel (CAC) for direct waves.

As described above, according to the follow-up notification method after the broadcast communication of the repeater 102 of the embodiment, high-quality services can be provided as follows. That is, when the direct repeating terminal station performs the follow-up communication after broadcasting communication, for example, more mobile stations 103 within the repeater zone can participate in the broadcasting communication.

The repeater 102 of the embodiment is provided with the transmitter (TX) and receiver (RX) of the base station wireless unit 111 as the first wireless unit that performs transmission and reception using a frequency for communicating with the base station 101. Further, the repeater 102 is provided with the transmitter (TX) and receiver (RX) of the direct wireless unit 112 as the second wireless unit that performs transmission and reception using a frequency for communicating with the mobile station 103. In the embodiment, a signal of the voice data (TCH) for performing a contact or report, for example, for users of the mobile stations 103 is used as the broadcast communication signal. Further, the UI signal (signal for designating a direct communication wireless channel and for setting a direct communication simplex call) is used as a switching signal for switching the mobile station 103 to the broadcast communication channel (the USC for direct waves in the embodiment).

Here, configurations of systems or apparatuses according to the present invention are not necessarily limited to those described above; further, various configurations may be used. The present invention can provide, for example, a method or system for performing a processing according to the present invention, a program for realizing such a method or system, and a recording medium for recording the program; further, the present invention can provide various systems or apparatuses.

The application field of the present invention is not necessarily limited to those described above; further, the present invention is applicable to various fields.

As various processings performed by systems or apparatuses according to the present invention, a configuration controlled by executing a control program stored in a ROM (Read Only Memory) by a processor may be used in a hardware resource including, for example, a processor and a memory. Further, a configuration of a hardware circuit in which, for example, each functional means for performing the processing is independent from each other may be used.

The present invention can be grasped as the program (itself) and a computer-readable storage medium such as a floppy (trademark) disc and CD (Compact Disc)-ROM storing the above-described control program. Further, when the control program is supplied to a computer from the recording medium to be executed by a processor, a processing according to the present invention can be executed.

It should be further understood by those skilled in the art that although the foregoing description has been made on embodiments of the invention, the invention is not limited thereto and various changes and modification may be made without departing from the spirit of the invention and the scope of the appended claims.

The invention claimed is:

1. A repeater comprising:
a first wireless unit that performs transmission and reception using a frequency for communicating with a base station; and
a second wireless unit that performs transmission and reception using a frequency for communicating with a mobile station, wherein:
the repeater causes, while the second wireless unit transmits a broadcast communication signal to the mobile station, a transmitter provided on the first wireless unit to regularly transmit a switching signal for switching the mobile station to a broadcast communication channel.

2. The repeater according to claim 1, wherein:
the first wireless unit includes a transmitter having a transmission function and a receiver having a reception function;
the second wireless unit includes a transmitter having a transmission function and a receiver having a reception function;
before broadcast communication starts, the transmitter and receiver of the first wireless unit and the transmitter and receiver of the second wireless unit each are in a transmission/reception standby state via a control channel; and
when the broadcast communication starts, the receiver of the first wireless unit changes to a reception standby state via a communication channel corresponding to the reception from the base station, the transmitter and receiver of the second wireless unit change to the transmission/reception standby state via a communication channel corresponding to the transmission and reception with the mobile station, the transmitter of the first wireless unit changes to a transmission standby state via the control channel corresponding to the transmission to the mobile station, and the transmitter of the first wireless unit regularly transmits a switching signal for switching the mobile station to a broadcast communication channel.

3. A follow-up notification method after broadcast communication of a repeater comprising a first wireless unit that performs transmission and reception using a frequency for communicating with a base station, and a second wireless unit that performs transmission and reception using a frequency for communicating with a mobile station, the method comprising the steps of:
transmitting, by the second wireless unit, a broadcast communication signal to the mobile station; and
transmitting regularly, by a transmitter provided on the first wireless unit, a switching signal for switching the mobile station to a broadcast communication channel while the broadcast communication signal is transmitted.

4. The method according to claim 3, wherein:
the transmitter of the second wireless unit switches, after transmitting to the mobile station the switching signal for switching the mobile station to the broadcast communication channel once, a channel to the broadcast communication channel and transmits the broadcast communication signal to the mobile station; and
the repeater causes, while the second wireless unit transmits the broadcast communication signal, the transmitter provided on the first wireless unit to regularly transmit the switching signal to the mobile station.

5. The method according to claim 4, wherein:
a communication group for performing transmission and reception of the broadcast communication signal is established between the base station and another mobile station already receiving the switching signal transmitted by the second wireless unit; and
the mobile station receiving the switching signal transmitted by the first wireless unit participates in the communication group.

6. The method according to claim 3, wherein:
the mobile station that fails to receive the switching signal transmitted by the transmitter of the second wireless unit changes, when receiving the switching signal regularly transmitted by the first wireless unit once, from a state of receiving the switching signal via the control channel to a state of receiving the broadcast communication signal via the broadcast communication channel.

7. A wireless communication system, comprising:
a base station that manages a first communication area;
a repeater that includes a first wireless unit communicating with the base station using one or multiple frequencies, and a second wireless unit communicating with a mobile station using a second frequency, and that controls a second communication area;
a mobile station that communicates with the repeater using the second frequency within the second communication area; and
a control station that is connected to the base station and that controls a control channel and broadcast communication channel using the one or multiple frequencies and the second frequency, and that transmits a signal to the mobile station via the repeater, wherein:
the repeater causes, while the second wireless unit transmits a broadcast communication signal to the mobile station via the broadcast communication channel using the second frequency, a transmitter provided on the first wireless unit to regularly transmit a switching signal for switching the mobile station to a broadcast communication channel.

8. The wireless communication system according to claim 7, wherein:
one control channel is allocated to each base station between the base station and the repeater;
another control channel is allocated between the repeater and the mobile station; and
the one control channel and the another control channel are in one-to-one corresponding relationship.

9. The wireless communication system according to claim 7, further comprising:
a second repeater that controls a third communication area arranged so as not to be geographically overlapped with the second communication area; and
a third mobile station that communicates with the second repeater using the second frequency within the third communication area.

10. The wireless communication system according to claim 7, wherein:
the repeater causes, while the second wireless unit transmits the broadcast communication signal using the second frequency to the mobile station, the transmitter provided on the first wireless unit to regularly transmit via the control channel using the second frequency a switching signal for switching the mobile station to a broadcast communication channel using the second frequency.

11. The wireless communication system according to claim 10, wherein:
when a plurality of mobile stations are present within the second area, each of the plurality of mobile stations directly communicates with each other using the second frequency without relaying the repeater.

12. The wireless communication system according to claim 7, wherein:
the mobile station receiving the switching signal receives a voice signal or a data signal as the broadcast communication signal from the base station.

* * * * *